(12) United States Patent
Chung et al.

(10) Patent No.: US 9,692,269 B2
(45) Date of Patent: Jun. 27, 2017

(54) WINDING CONFIGURATION OF DOUBLY SALIENT PERMANENT MAGNET ELECTRIC MACHINE

(75) Inventors: Shi Uk Chung, Jinhae (KR); Yeon Ho Jeong, Changwon (KR); Byung Chul Woo, Changwon (KR); Ji Young Lee, Changwon (KR)

(73) Assignee: KOREA ELECTROTECHNOLOGY RESEARCH INSTITUTE, Changwon (KR)

( * ) Notice: Subject to any disclaimer, the term of this patent is extended or adjusted under 35 U.S.C. 154(b) by 537 days.

(21) Appl. No.: 13/695,259

(22) PCT Filed: Mar. 31, 2011

(86) PCT No.: PCT/KR2011/002200
§ 371 (c)(1),
(2), (4) Date: Dec. 6, 2012

(87) PCT Pub. No.: WO2011/136475
PCT Pub. Date: Nov. 3, 2011

(65) Prior Publication Data
US 2013/0076159 A1    Mar. 28, 2013

(30) Foreign Application Priority Data
Apr. 28, 2010 (KR) .................. 10-2010-0039704

(51) Int. Cl.
*H02K 3/28* (2006.01)
*H02K 41/03* (2006.01)
(Continued)

(52) U.S. Cl.
CPC .............. *H02K 3/28* (2013.01); *H02K 16/02* (2013.01); *H02K 21/16* (2013.01); *H02K 41/031* (2013.01);
(Continued)

(58) Field of Classification Search
CPC .................. H02K 41/031; H02K 41/03
(Continued)

(56) References Cited

U.S. PATENT DOCUMENTS 6,476,524 B1* 11/2002 Miyamoto et al. ......... 310/12.19
2005/0134122 A1* 6/2005 Uchida ............... G03F 7/70758
310/12.25
(Continued)

FOREIGN PATENT DOCUMENTS

JP         10-164820 A     6/1998
JP         11262236 A  *  9/1999  ............ H02K 41/03
(Continued)

OTHER PUBLICATIONS

JPO Machine Translation, Shikayama et al., JP 11262236 A, Sep. 24, 1999.*
(Continued)

*Primary Examiner* — Thomas Truong

(57) ABSTRACT

The present invention relates to a doubly salient permanent magnet electric machine that has a winding structure in which series-connected windings are included in the phase windings of a mover, and that has a stator implemented as an iron core having a plurality of permanent magnets and a plurality of stator salient poles neighboring the permanent magnets, thus reducing the number of permanent magnets by half. An electric machine is configured such that a mover moves while facing a stator and includes an N (a number of power phases) multiple number of teeth and phase windings wound around the teeth, and one or more pairs of phase windings of the mover mutually having a phase difference of 180° are connected in series, and the stator includes permanent magnets in depressions between individual stator salient poles of an iron core in which the stator salient poles are formed.

6 Claims, 16 Drawing Sheets

(51) Int. Cl.
  *H02K 16/02*    (2006.01)
  *H02K 21/16*    (2006.01)
  *H02K 1/14*     (2006.01)
  *H02K 1/27*     (2006.01)

(52) U.S. Cl.
  CPC ............ *H02K 1/14* (2013.01); *H02K 1/2746* (2013.01); *H02K 2213/03* (2013.01); *H02K 2213/12* (2013.01)

(58) Field of Classification Search
  USPC ..................................................... 310/12.22
  See application file for complete search history.

(56)          References Cited

U.S. PATENT DOCUMENTS

2006/0012252 A1*  1/2006  Miyata et al. ................. 310/12
2008/0048505 A1*  2/2008  Moriyama et al. ............. 310/12
2009/0009010 A1*  1/2009  Chung et al. .................. 310/46
2009/0072634 A1*  3/2009  Vollmer .......................... 310/12
2010/0259112 A1* 10/2010  Chung et al. ............... 310/12.18

FOREIGN PATENT DOCUMENTS

JP         11-308848  A    11/1999
JP         2002-034229 A   1/2002

OTHER PUBLICATIONS

International Search Report for PCT/KR2011/002200 filed on Mar. 31, 2011.

\* cited by examiner

WINDING CONFIGURATION OF DOUBLY SALIENT PERMANENT MAGNET ELECTRIC MACHINE

TECHNICAL FIELD

The present invention relates, in general, to the structure of a doubly salient permanent magnet electric machine and, more particularly, to a doubly salient permanent magnet electric machine that has a winding structure in which series-connected windings are included in the phase windings of a mover, and that has a stator implemented as an iron core having a plurality of permanent magnets and a plurality of stator salient poles neighboring the permanent magnets, thus reducing the number of permanent magnets by half.

BACKGROUND ART

FIG. 1 illustrates an example of a conventional electric machine. Referring to FIG. 1, the conventional electric machine is an example of a permanent magnet linear synchronous motor, and includes a mover 10 having phase windings 12, in which U, V, and W phases are repeated on a mover iron core 11 having a three multiple number of teeth, and a stator 20 in which permanent magnets 21 are arranged on a linear stator iron core without using stator salient poles so that the permanent magnets 21 have polarities opposite to those of neighboring permanent magnets.

However, the structure of the conventional linear electric machine is problematic in that as a movement distance is lengthened, the number of permanent magnets used is increased and then cost is inevitably increased, and in that the pulsation of a propulsive force and a attraction force is produced due to end effects occurring at the ends of the inlet and outlet of the mover, so that the linear electric machine is not suitable for the control of precise location.

DISCLOSURE

Technical Problem

Accordingly, the present invention has been made keeping in mind the above problems occurring in the prior art, and an object of the present invention is to provide a doubly salient permanent magnet electric machine that has a winding structure in which series-connected windings are included in the 3-phase windings of a mover, and that has a stator implemented as an iron core having a plurality of permanent magnets and a plurality of stator salient poles neighboring the permanent magnets, thus reducing the number of permanent magnets by half.

Technical Solution

First, the features of the present invention are summarized. An electric machine in accordance with an aspect of the present invention to accomplish the above object is characterized in that a mover moves while facing a stator and includes an N (a number of power phases) multiple number of teeth and phase windings wound around the teeth, and one or more pairs of phase windings of the mover electrically have a phase difference ($\beta$) of 180°, the mover is configured such that a plurality of phase windings are included in a phase winding group for each of N phases, and one or more pairs of windings for a corresponding phase and a reverse phase (/phase) wound around respective teeth to electrically have a phase difference ($\beta$) of 180°, among phase windings included in each phase winding group, are connected to have opposite current directions, and adjacent phase winding groups are arranged such that a separation distance ($\alpha$) therebetween electrically has a difference corresponding to a phase angle of 180/N°.

The stator may include permanent magnets in depressions between individual stator salient poles of an iron core in which the stator salient poles are formed. The stator salient poles may be arranged such that a pole pitch ($\tau_p$) corresponding to a distance from a first end of each permanent magnet to a stator salient pole adjacent to a second end of the permanent magnet electrically has a phase angle of 180°.

The mover may include phase windings for three phases U, V, and W and phase windings for phases /U, /V, /W having a phase difference of 180° with respect to the respective three phases, the mover including a first phase winding group including phase windings for U and /U phases, or an odd or even number of phase windings for U and /U phases that are repeated adjacent to each other; a second phase winding group including phase windings for V and /V phases, or an odd or even number of phase windings for V and /V phases that are repeated adjacent to each other; and a third phase winding group including phase windings for W and /W phases, or an odd or even number of phase windings for W and /W phases that are repeated adjacent to each other.

One or more pairs of windings for U and /U phases, among phase windings included in the first phase winding group, may be connected in series, one or more pairs of windings for V and /V phases, among phase windings included in the second phase winding group, may be connected in series, and one or more pairs of windings for W and /W phases, among phase windings included in the third phase winding group, may be connected in series.

The mover may be configured such that an even number of four or more phase windings are included in a phase winding group for each of the N phases, and phase windings mutually having a phase difference of 180° are selectively wound around only some teeth, such as one or more pairs, and are connected in series in each phase winding group.

The mover may include teeth arranged at regular intervals of $\delta$, wherein $\delta$ is determined by $\delta=(N_t\pm m)\tau_p/N_t$, where $N_t$ denotes a number of teeth formed in the mover, and m denotes a natural number less than $N_t$.

The teeth may be arranged at regular intervals in the mover, and the phase windings may be arranged such that phase windings for a corresponding phase and a /phase for each of the N phases are not adjacent to one another.

The electric machine may further include a structure in which individual stators are arranged on opposite sides of the mover along a direction perpendicular to a motional direction of the mover, thus canceling a magnetic attraction force between the mover and the individual stators.

Individual movers may be arranged on opposite sides of the stator, thus canceling a magnetic attraction force between the stator and the individual movers.

The mover may be configured in a form of an air core without using an iron core.

The stator may has a shape of a circle, and the mover may include a form in which the mover rotates inside or outside the stator.

Further, an electric machine in accordance with another aspect of the present invention is characterized in that a first mover and a second mover move while facing a stator, each of the first and second movers includes an N (a number of power phases) multiple number of teeth and phase windings wound around the teeth, and one or more pairs of phase windings of the first or second mover electrically have a phase difference (β) of 180°, the first or second mover is configured such that a plurality of phase windings are included in a phase winding group for each of N phases, and one or more pairs of windings for a corresponding phase and a reverse phase (/phase) wound around respective teeth to electrically have a phase difference (β) of 180°, among phase windings included in each phase winding group, are connected to have opposite current directions, and adjacent phase winding groups are arranged such that a separation distance (α) therebetween electrically has a difference corresponding to a phase angle of 180/N°.

Each of the first and second movers may include phase windings for each of the N phases and phase windings having a phase difference of 180° with respect to the respective N phases, and one or more pairs of the phase windings of the first mover or the second mover are connected in series, or one or more of phase winding pairs mutually having a phase difference of 180° between the first and second movers are connected in series.

The stator may include permanent magnets in depressions between individual stator salient poles of an iron core in which the stator salient poles are formed.

Each of the first and second movers may include phase windings for three phases U, V, and W and phase windings for phases /U, /V, /W having a phase difference of 180° with respect to the respective three phases, each of the first and second movers including a first phase winding group including phase windings for U and /U phases, or an odd or even number of phase windings for U and /U phases that are repeated adjacent to each other; a second phase winding group including phase windings for V and /V phases, or an odd or even number of phase windings for V and /V phases that are repeated adjacent to each other; and a third phase winding group including phase windings for W and /W phases, or an odd or even number of phase windings for W and /W phases that are repeated adjacent to each other.

One or more of phase winding pairs mutually having a phase difference of 180° for each phase between a phase winding group having an odd number of phase windings of the first mover and a phase winding group having an odd number of phase windings of the second mover, may be connected in series.

Each of the first mover and the second mover may be configured such that phase windings wound around an odd number of three or more teeth are included in a phase winding group for each of the N phases, and such that only phase windings for a corresponding phase of each phase winding group in the first mover are wound, only phase windings having a phase difference of 180° with respect to the corresponding phase in the second mover are wound, and the phase windings of the first mover and the phase windings of the second mover having the phase difference of 180° are connected in series for each phase.

Advantageous Effects

In a doubly salient electric machine according to the present invention, a stator can be composed of permanent magnets and stator salient poles neighboring the permanent magnets, thus reducing the number of permanent magnets used compared to a conventional form.

Further, the present invention provides an electric machine in which a first mover and a second mover are arranged to be electrically spaced apart from each other by a predetermined phase angle, thus reducing the pulsation of a propulsive force and a attraction force. The electric machine can be configured in a form in which attraction forces are canceled by means of double-sided arrangement of a mover or a stator.

Furthermore, since a doubly salient electric machine according to the present invention can acquire low-noise/low-vibration, high-precision, and high-propulsive motions, it can be used in fields requiring direct driving or precise location control, or various application devices requiring linear or rotary motions, such as power generators, compressors, processors, or industrial electric machines.

BEST MODE

Figure 1:
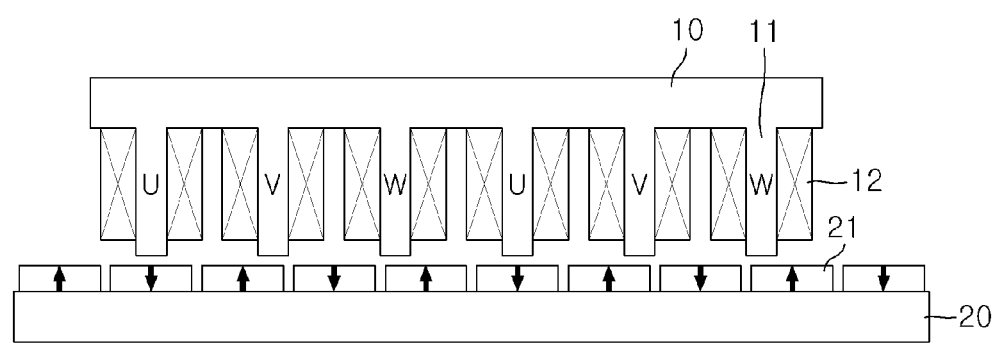
FIG. 1 illustrates an example of a conventional electric machine.

Hereinafter, preferred embodiments of the present invention will be described in detail with reference to the attached drawings and details described in the drawings, but the present invention is not limited or restricted by the above embodiments.

An electric machine described in the present invention denotes an energy converter for converting electrical energy into kinetic energy or converting kinetic energy into electrical energy, so that the electric machine includes an electric motor, a driver, and a power generator, and refers to an electric machine for realizing the above-described energy conversion based on a linear motion, a rotary motion, or a combination of linear and rotary motions (for example, a curvilinear motion).

FIGS. 2 to 6 are diagrams showing doubly salient electric machines having a single mover according to the present invention.

First, as shown in FIGS. 2 to 6, a doubly salient electric machine according to the present invention is configured such that a mover 110 moves while facing a stator 150 and includes an N (the number of power phases) multiple number of teeth 111 and phase windings 112 wound around the respective teeth, and such that the stator 150 includes permanent magnets 151 arranged in depressions between individual stator salient poles 152 of an iron core in which the stator salient poles 152 are formed. Here, the permanent magnets 151 have the same polarity, and all of the permanent magnets can be arranged as either N-pole or S-pole permanent magnets. A pole pitch $\tau_p$ corresponding to a distance from one end of a single permanent magnet 151 to a stator salient pole adjacent to the other end of the permanent magnet 151 electrically has a phase angle of 180°.

The mover 110 includes phase windings for each of N (the number of power phases) phases, and phase windings having a phase difference of 180° with respect to the respective N phases. That is, in the case of 3 phases (N=3), the mover 110 may include phase windings for the U, V, and W phases, and phase windings for reverse (/U, /V, and /W) phases having a phase difference of 180° with respect to the respective three phases. In this case, in each group of teeth and phase windings arranged such that any one phase and a /phase (having a phase difference of 180°) are repeated adjacent to each other, an odd number or even number of teeth and phase windings may be included.

Figure 17:
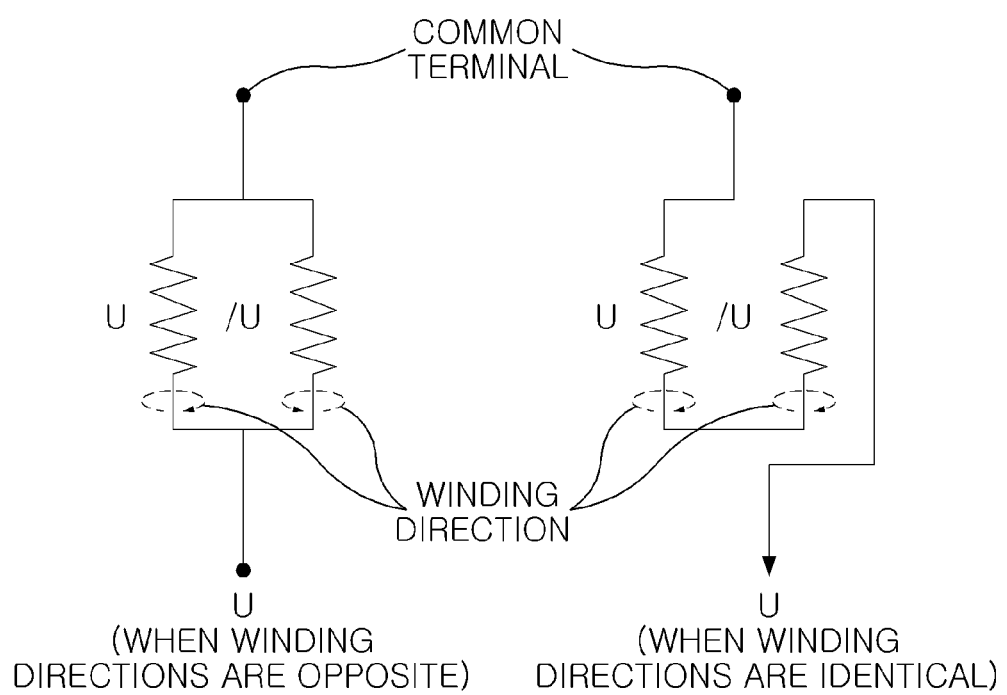
FIG. 17 is a diagram showing series-connection of phase windings based on the winding direction of the phase windings.

In particular, in the present invention, one or more pairs of the phase windings 112 of the mover 110 mutually having a phase difference of 180° are connected in series. Here, series connection denotes that two windings are connected in series between a power input terminal for any phase (for example, a U phase) and another terminal (for example, a common terminal at which the windings for the respective phases are connected in common). As shown in FIG. 17, when winding directions are identical, that is, when two windings are wound clockwise, series connection can be made in such a way that any one end of one phase winding (for example, a U phase winding) is connected to the other end of the other winding (for example, a /U phase winding). As shown in FIG. 17, when winding directions are opposite to each other, that is, when one winding is wound clockwise and the other winding is wound counterclockwise, series connection can be made in such a way that ends of the two phase windings are connected to a common terminal and the remaining ends of the two phase windings are connected to a power input terminal.

Figure 2:
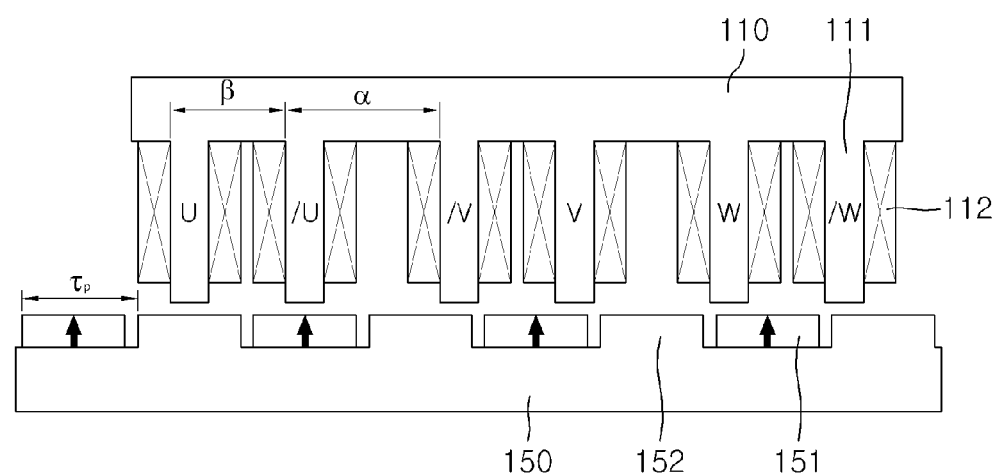
FIG. 2 is a diagram showing an embodiment of a doubly salient electric machine having a single mover according to the present invention.

As shown in FIG. 2, in the case of 3 phases (N=3), the mover 110 can be configured such that U and /U phase windings are connected in series in a phase winding group composed of two phases of U and /U, V and /V phase windings are connected in series in a phase winding group composed of two phases of V and /V, and W and /W phase windings are connected in series in a phase winding group composed of two phases of W and /W.

Figure 3:
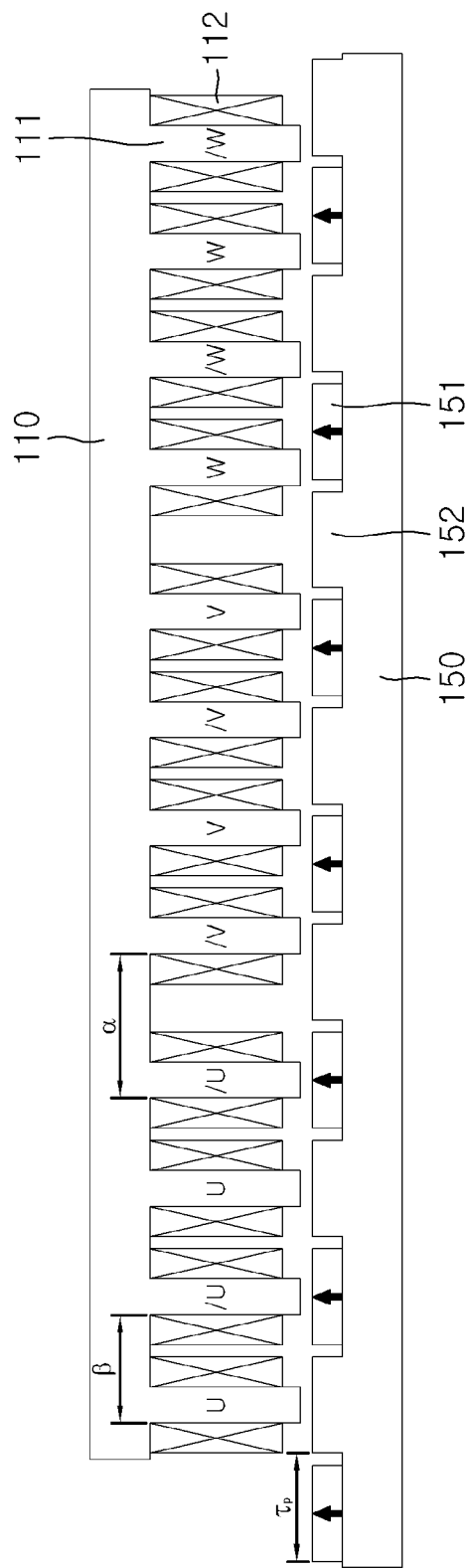
FIG. 3 is a diagram showing another embodiment of a doubly salient electric machine having a single mover according to the present invention.

As shown in FIG. 3, in the case of 3 phases (N=3), the mover 110 can be configured such that one or more pairs of U and /U phase windings, among phase windings included in a phase winding group composed of four phase windings in which U and /U phases are repeated adjacent to each other, can be connected in series. Further, one or more pairs of V and /V phase windings, among phase windings included in a phase winding group composed of four phase windings in which V and /V phases are repeated adjacent to each other, can be connected in series. Furthermore, one or more pairs of W and /W phase windings, among phase windings included in a phase winding group composed of four phase windings in which W and /W phases are repeated adjacent to each other, can be connected in series.

The number of phase windings in the phase winding group for each of U, V, and W may be 2, as shown in FIG. 2, may be 4, as shown in FIG. 3, and may be an even number greater than 4, or an odd number, such as 3, 5, 7, . . . , depending on the circumstances.

Figure 4:
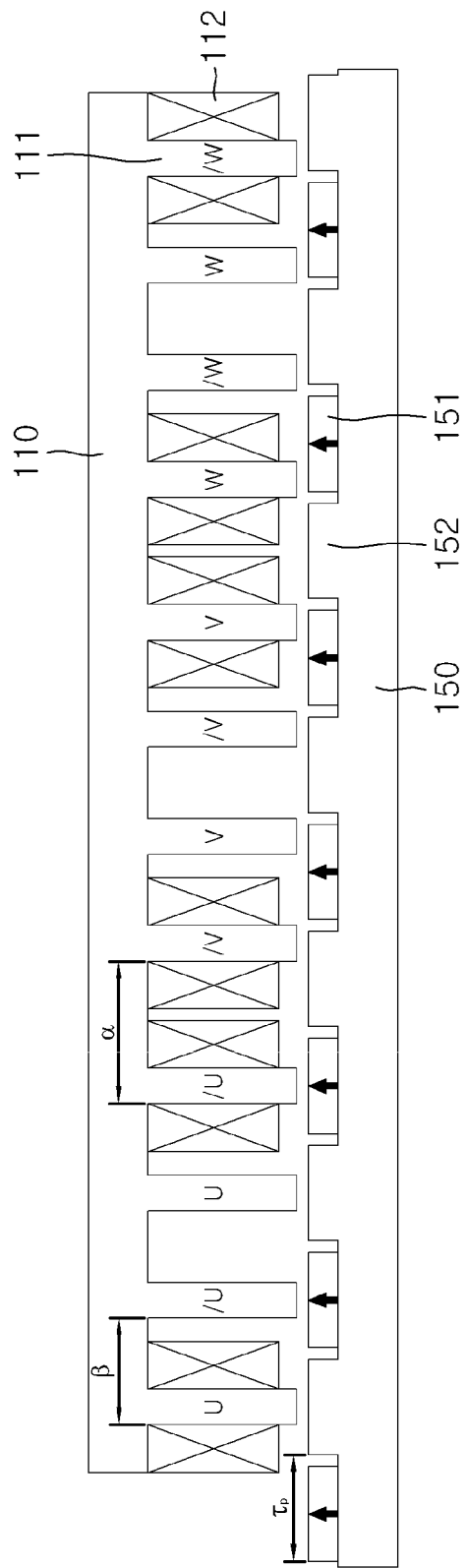
FIG. 4 is a diagram showing a further embodiment of a doubly salient electric machine having a single mover according to the present invention.

In FIGS. 2 to 4, the phase windings of each phase winding group are wound side by side to be spaced apart from each other by a predetermined interval β, for example, to electrically have a difference corresponding to a phase angle of 180°, and the phase winding groups are arranged such that a separation distance therebetween electrically has a difference corresponding to a phase angle of, for example, 180/N, that is, 60° when N=3. Consequently, phase windings at adjacent opposite ends of two groups are arranged to be spaced apart from each other by a predetermined interval α, for example, to electrically have a difference corresponding to a phase angle of 120° (60° and 120° having the relationship of supplementary angles denote an identical case and correspond to 180/N).

Meanwhile, as shown in FIG. 4, in the case of 3 phases (N=3), the mover 110 is configured such that an even number of four or more teeth 111 are provided in each phase winding group and such that phase windings mutually having a phase difference of 180° are selectively wound around only some teeth and are connected in series in each phase winding group. FIG. 4 shows an example in which, when the phase winding group has four teeth 111, phase windings mutually having a phase difference of 180° are selectively wound around only teeth at opposite ends of the phase winding group, but the present invention is not limited to this example. When an even number of teeth 111, such as 6, 8, . . . , teeth, are provided in a phase winding group, phase windings mutually having a phase difference of 180° can be wound around only some teeth, such as one or more pairs (including two pairs, three pairs, etc.), and the phase windings mutually having a phase difference of 180° are connected in series. This configuration results in the effect of reducing the total number of windings.

Figure 5:
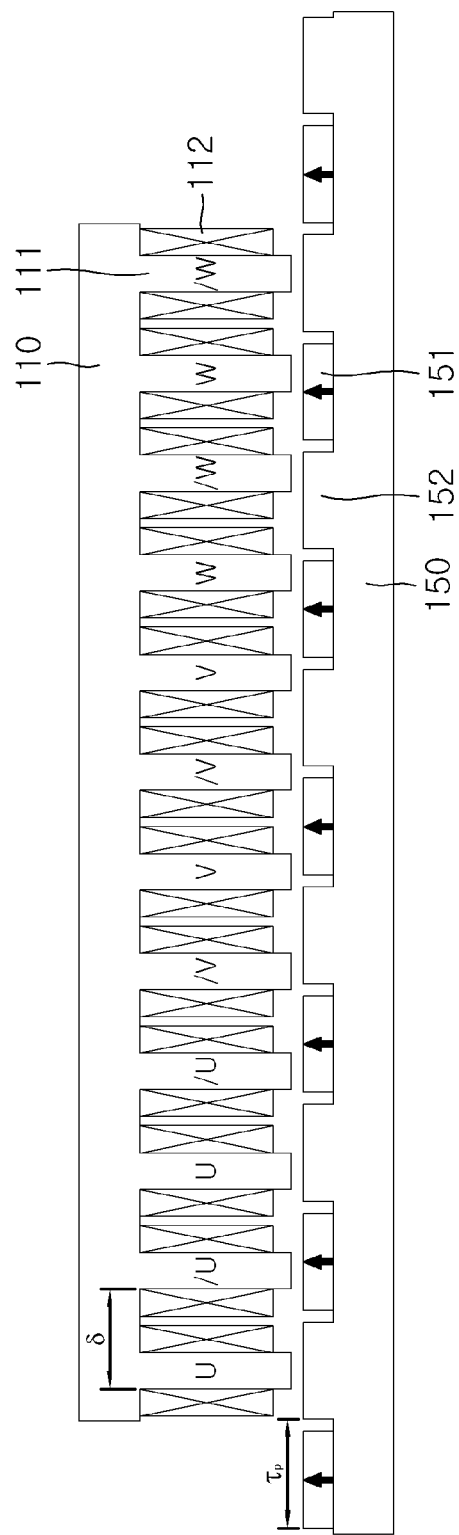
FIG. 5 is a diagram showing yet another embodiment of a doubly salient electric machine having a single mover according to the present invention.

Further, as shown in FIG. 5, the teeth 111 formed in the mover 110 can be arranged at regular intervals of δ. Here, in each phase winding group, one or more pairs of corresponding phase and /phase windings among phase windings (an even number or odd number of windings) wound around the teeth 111 are connected in series. δ can be determined by the following Equation 1. In Equation 1, $N_t$ denotes the number of teeth 111 formed in the mover 110, and m denotes a natural number less than $N_t$.

$$\delta = (N_t \pm m)\tau_p / N_t \qquad \text{[Equation 1]}$$

Figure 6:
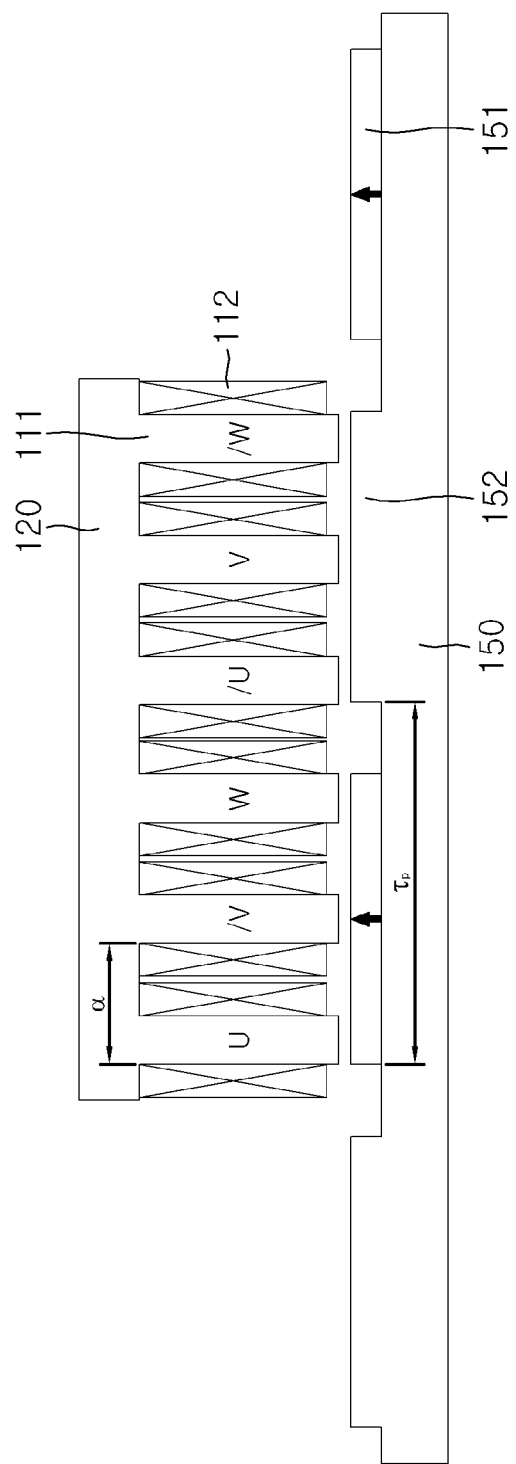
FIG. 6 is a diagram showing still another embodiment of a doubly salient electric machine having a single mover according to the present invention.

Further, as shown in FIG. 2, phase windings composed of corresponding phases and reverse phases (/phases) can be grouped and arranged as individual phase winding groups, that is, a U group (a group of adjacent U and /U phase windings), a V group (a group of adjacent V and /V phase windings), and a W group (a group of adjacent W and /W phase windings). However, as shown in FIG. 6, in the case of 3 phases (N=3), phase windings for respective three phases U, V, and W and phase windings for three phases (/U, /V, /W) having a phase difference of 180° with respect to the respective three phases are wound around the respective teeth, wherein the teeth 111 are arranged at regular intervals of α (for example, a phase angle of 120° in the case of 3 phases), and the phase windings composed of corresponding phases and /phases may not be grouped and arranged adjacent to one another. In this case, the sequence in which the phase windings are arranged may be U-/V-W-/U-V-/W, as shown in FIG. 6, wherein U and /U phase windings are connected in series, V and /V phase windings are connected in series, and W and /W phase windings are connected in series.

Meanwhile, "/phase" denoted in the present invention strictly means that the direction of a winding or the direction of a current is a reverse direction. Actually, when phase windings are arranged at regular intervals of δ as in the case of FIGS. 5 and 16, U and /U (or V and /V and W and /W) mean that the flows of currents are opposite to each other without meaning an interval of 180°, wherein a phase angle of 180° denotes a result occurring when the directions of currents or windings are caused to be opposite to each other. That is, comprehensively, any phase and a /phase mean that the directions of windings or currents are caused to be opposite to each other.

MODE FOR INVENTION

Thus far, the case of a single mover 110 has been described. Hereinafter, embodiments in which a principal identical to that of the above description is applied to the case where the number of movers is two, as shown in FIGS. 7 to 11, will be described.

Figure 7:
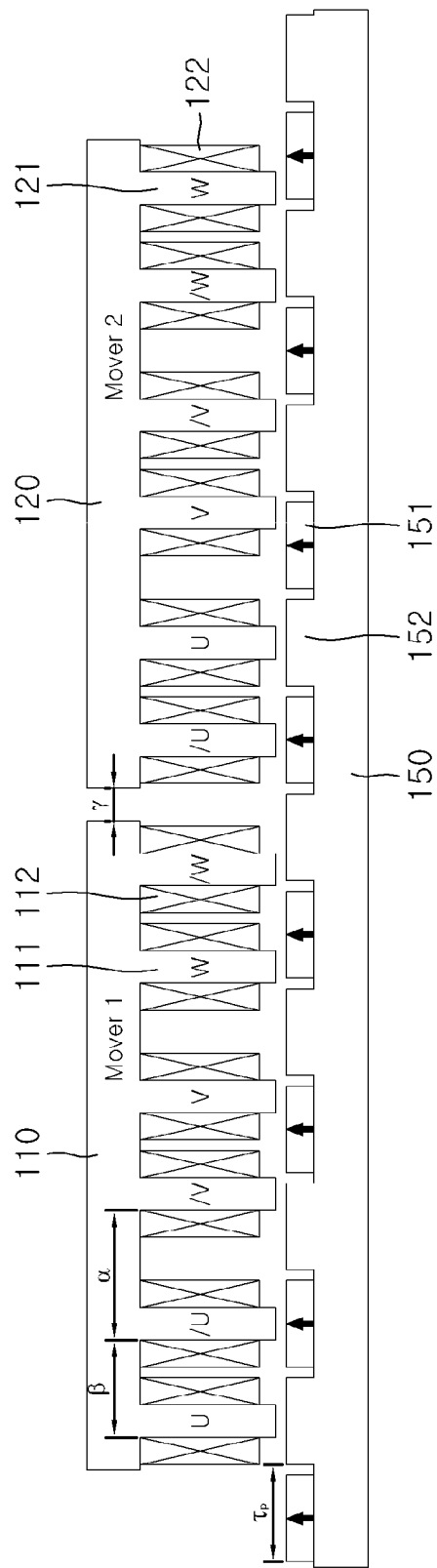
FIG. 7 is a diagram showing an embodiment of a doubly salient electric machine having two movers according to the present invention.

First, as shown in FIG. 7, a first mover 110 and a second mover 120 move while facing a stator 150, each mover 110/120 has an N (the number of power phases) multiple number of teeth 111 and phase windings 112 wound around the respective teeth, and the stator 150 includes permanent magnets 151 arranged in depressions between individual stator salient poles 152 of an iron core in which the stator salient poles 152 are formed. Here, the permanent magnets 151 have the same polarity, and all of the permanent magnets can be arranged as either N-pole or S-pole permanent magnets. A method of arranging the teeth 111 formed in the first mover 110 and the second mover 120 and a method of arranging the phase windings 112 wound around the respective teeth are similar to those of FIG. 2, and thus a detailed description thereof is omitted. The first mover 110 and the second mover 120 are arranged such that a separation distance γ therebetween electrically has a difference corresponding to, for example, a phase angle of 60°.

For example, as shown in FIG. 7, in each of the first mover 110 and the second mover 120, when an even number of phase windings are included in each phase winding group, one or more pairs of the phase windings of the first mover 110 mutually having a phase difference of 180° are connected in series. Further (alternatively), one or more pairs of the phase windings of the second mover 120 are connected in series. As shown in FIG. 7, when two phase windings, for example, are included in each phase winding group, U and /U phase windings of each mover are connected in series, V and /V phase windings are connected in series, and W and /W phase windings are connected in series. When an even number of four or more phase windings are included in each phase winding group, one or more pairs of the phase windings mutually having a phase difference of 180° can be connected in series.

Figure 8:
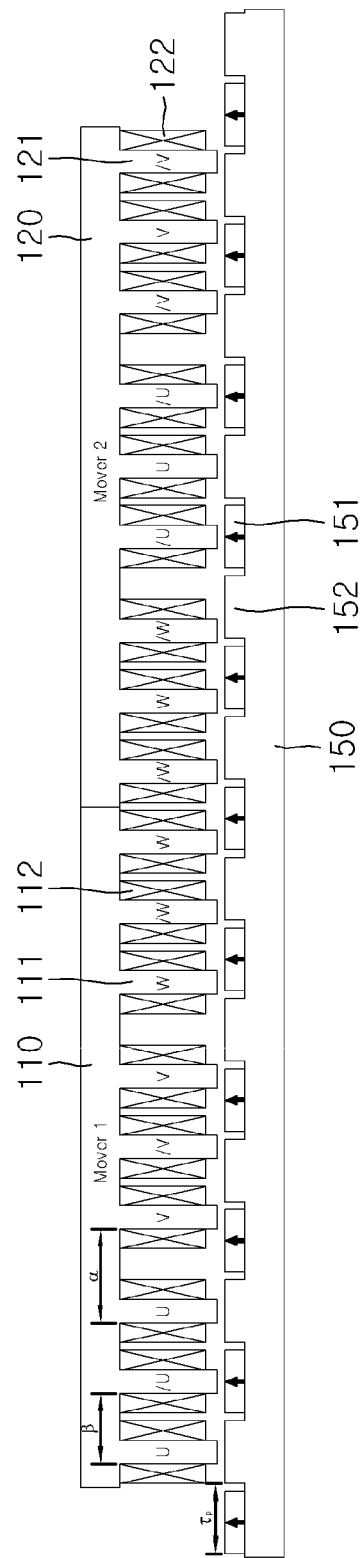
FIG. 8 is a diagram showing another embodiment of a doubly salient electric machine having two movers according to the present invention.

Further, as shown in FIG. 8, when an odd number of three or more phase windings are included in each phase winding group of the first mover 110 and the second mover 120, one or more of phase winding pairs mutually having a phase difference of 180° for each phase between a phase winding group including an odd number of phase windings of the first mover 110 and a phase winding group including an odd number of phase windings of the second mover 120, are connected in series. For example, the U phase winding of the first mover 110 and the /U phase winding of the second mover 120 are connected in series, the V phase winding of the first mover 110 and the /V phase winding of the second mover 120 are connected in series, and the W phase winding of the first mover 110 and the /W phase winding of the second mover 120 are connected in series. More pairs of phase winding pairs mutually having a phase difference of 180° between the phase winding group of the first mover 110 and the phase winding group of the second mover 120 can be connected in series.

Figure 9:
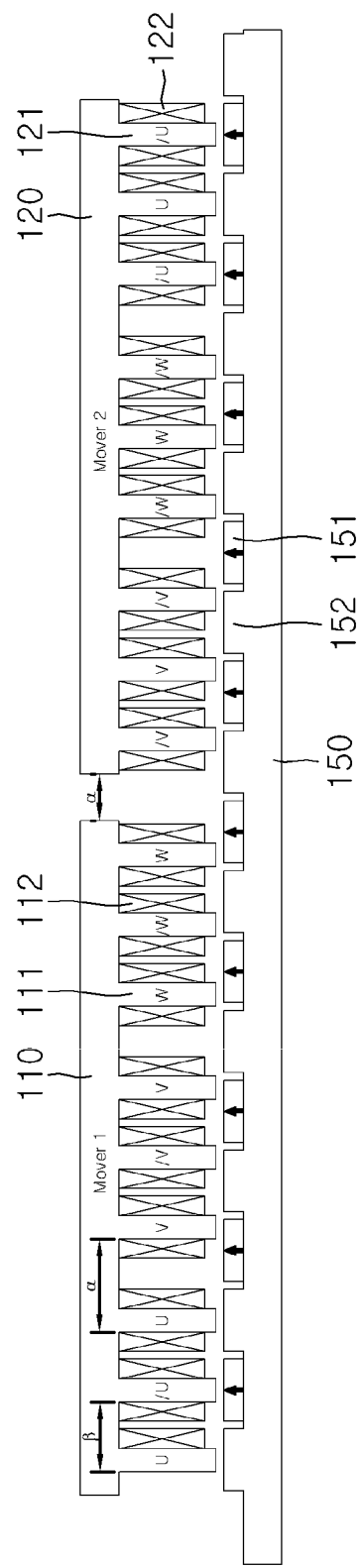
FIG. 9 is a diagram showing a further embodiment of a doubly salient electric machine having two movers according to the present invention.

In the case of FIG. 8, the separation distance between the first mover 110 and the second mover 120 is 0 (zero). As shown in FIG. 9, the first mover 110 and the second mover 120 can be arranged such that a separation distance therebetween is a predetermined interval α, for example, electrically has a difference corresponding to a phase angle of 120°.

Figure 10:
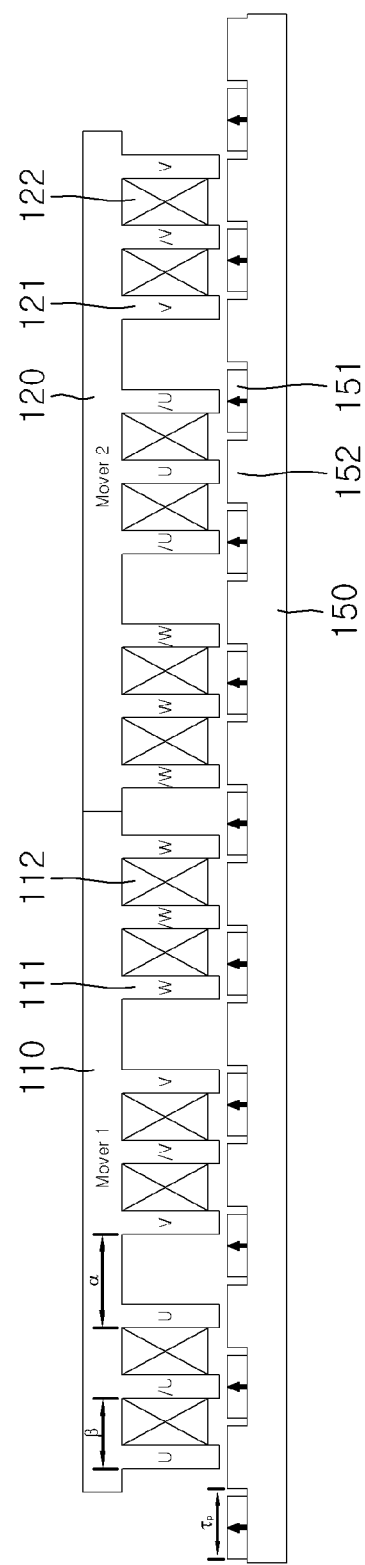
FIG. 10 is a diagram showing yet another embodiment of a doubly salient electric machine having two movers according to the present invention.
Figure 11:
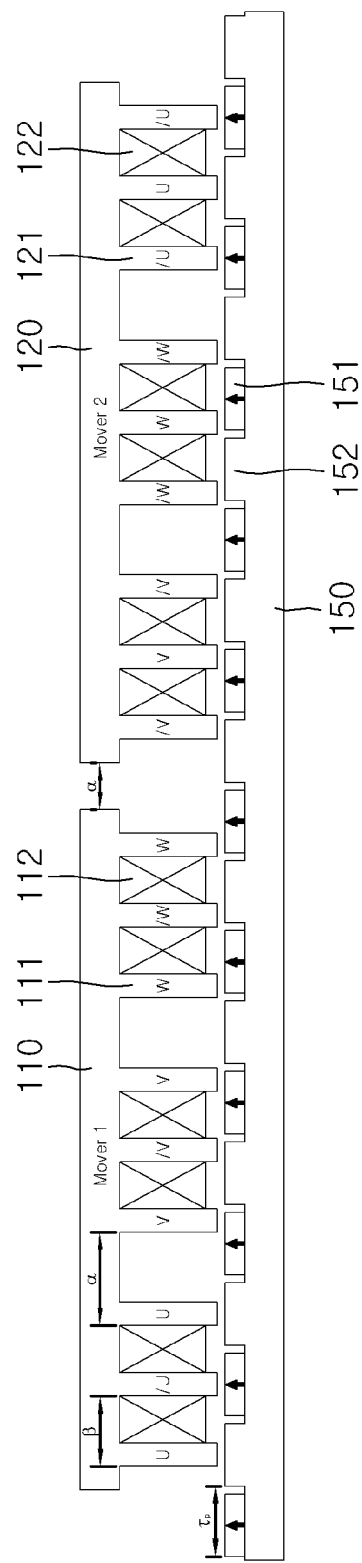
FIG. 11 is a diagram showing still another embodiment of a doubly salient electric machine having two movers according to the present invention.

Meanwhile, referring to FIG. 10, when having the configuration of the teeth 111/121 and the separation distance (0) of the first mover 110 and the second mover 120 shown in FIG. 8, the phase windings may be wound around only some teeth without being wound around all of the teeth 111/121. Similarly, even when having the configuration of the teeth 111/121 and the separation distance α of the first mover 110 and the second mover 120 shown in FIG. 9, the phase windings may be wound around only some teeth without being wound around all of the teeth 111/121, as shown in FIG. 11. For example, for each phase, a corresponding phase winding can be wound around only a specific phase (U, V, or W) of the second mover 120, and the corresponding phase winding can be wound around only a /phase (/U, /V, or /W) of the first mover 110. In this case, for each phase, the phase winding of the first mover 110 and the phase winding of the second mover 120 having a phase difference of 180° with respect to the phase winding are connected in series.

Figure 12:
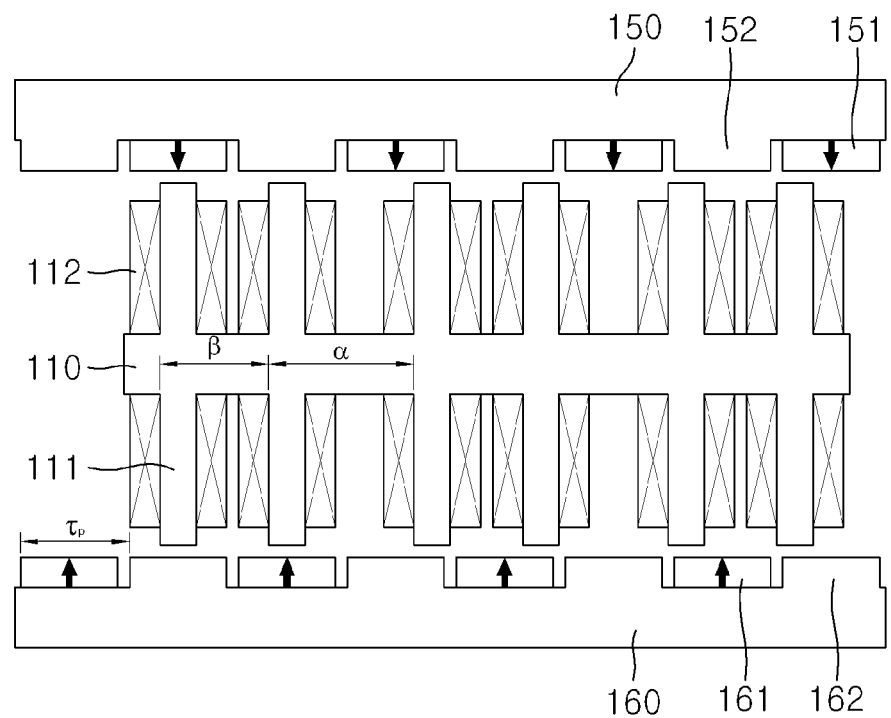
FIG. 12 is a diagram showing an example of application in which stators are arranged on opposite sides of a mover.

FIG. 12 illustrates an example of application in which stators 150/160 are arranged on opposite sides of a mover 110 according to the present invention.

Referring to FIG. 12, an electric machine according to the present invention includes a structure in which stators 150/160 having permanent magnets 151/161 and stator salient poles 152/162 on surfaces facing a single mover 110 are arranged on opposite sides of the mover 110, with the mover 110 interposed between the stators 150/160, in a direction perpendicular to the motional direction of the mover 110, thus canceling a magnetic attraction force between the mover 110 and the two stators 150/160. Here, the mover 110 may include phase windings 112 wound around the teeth 111 on both surfaces respectively facing the two stators 150/160, as shown in FIGS. 2 to 6. Here, the permanent magnets 151 of one stator 150 of the two stators 150/160 are preferably arranged to face the stator salient poles 162 of the other stator 160 that is arranged to face the stator 150.

Figure 13:
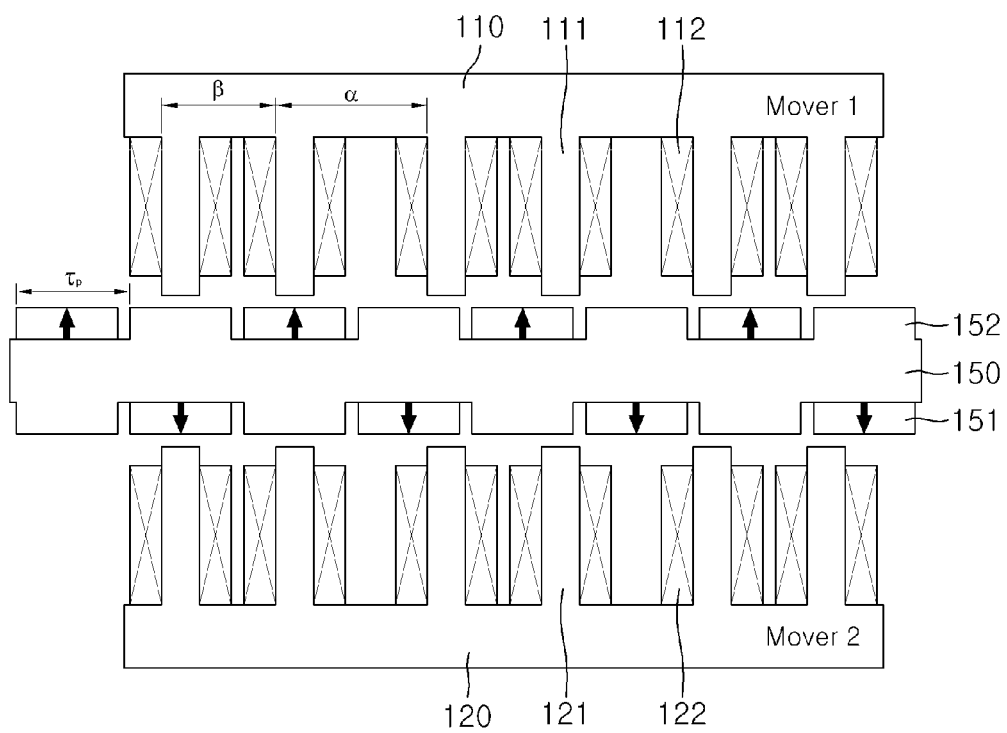
FIG. 13 is a diagram showing an example of application in which movers are arranged on opposite sides of a stator according to the present invention.

FIG. 13 illustrates an example of application in which movers 110/120 are arranged on opposite sides of a stator 150 according to the present invention.

Referring to FIG. 13, an electric machine according to the present invention includes a structure in which two movers 110/120 are arranged to face each other, and a stator 150 having permanent magnets 151 and stator salient poles 152 on both surfaces along a direction perpendicular to the motional direction of the movers, as shown in FIGS. 2 to 6, is disposed between the two movers 110/120, thus canceling a magnetic attraction force between the two movers 110/120 and the stator 150. Here, a repeated form of the permanent magnets 151 and the stator salient poles 152 provided on both surfaces of the stator 150 is preferably implemented as a repeated structure in which the permanent magnets 151 are arranged on one side surface of the stator 150 and the stator salient poles 152 are arranged at the corresponding locations of the opposite side surface of the stator.

Figure 14:
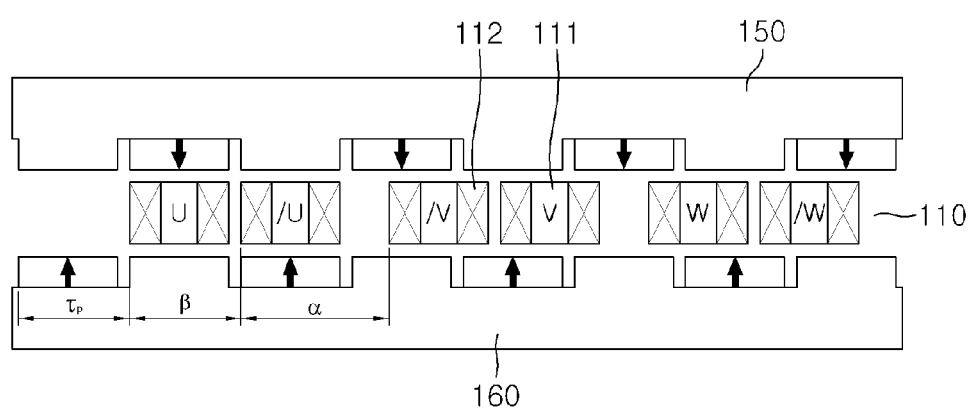
FIG. 14 is a diagram showing an example in which a mover is used in the form of an air core according to the present invention.

FIG. 14 illustrates an example in which the mover 110 is used in the form of an air core according to the present invention.

Referring to FIG. 14, an electric machine according to the present invention has a structure in which similar to FIGS. 2 to 6, two stators 150/160 having permanent magnets and stator salient poles are disposed to face each other, and a mover 110 having the phase winding structure similar to that of FIGS. 2 to 6 is arranged between the two stators 150/160 in the form of an air core without using an iron core. Here, similar to FIG. 12, the permanent magnets of one stator 150 of the two stators 150/160 are preferably arranged to face the stator salient poles of the other stator 160 that is arranged to face the stator 150.

The structures of FIGS. 12 to 14 that have been described are not always applied only to the case where there is a single mover, as shown in FIGS. 2 to 6, and it is apparent to those skilled in the art that the structures can be applied even to the case where two or more movers are present, as shown in FIGS. 7 to 11, by means of slight modification of design.

Figure 15:
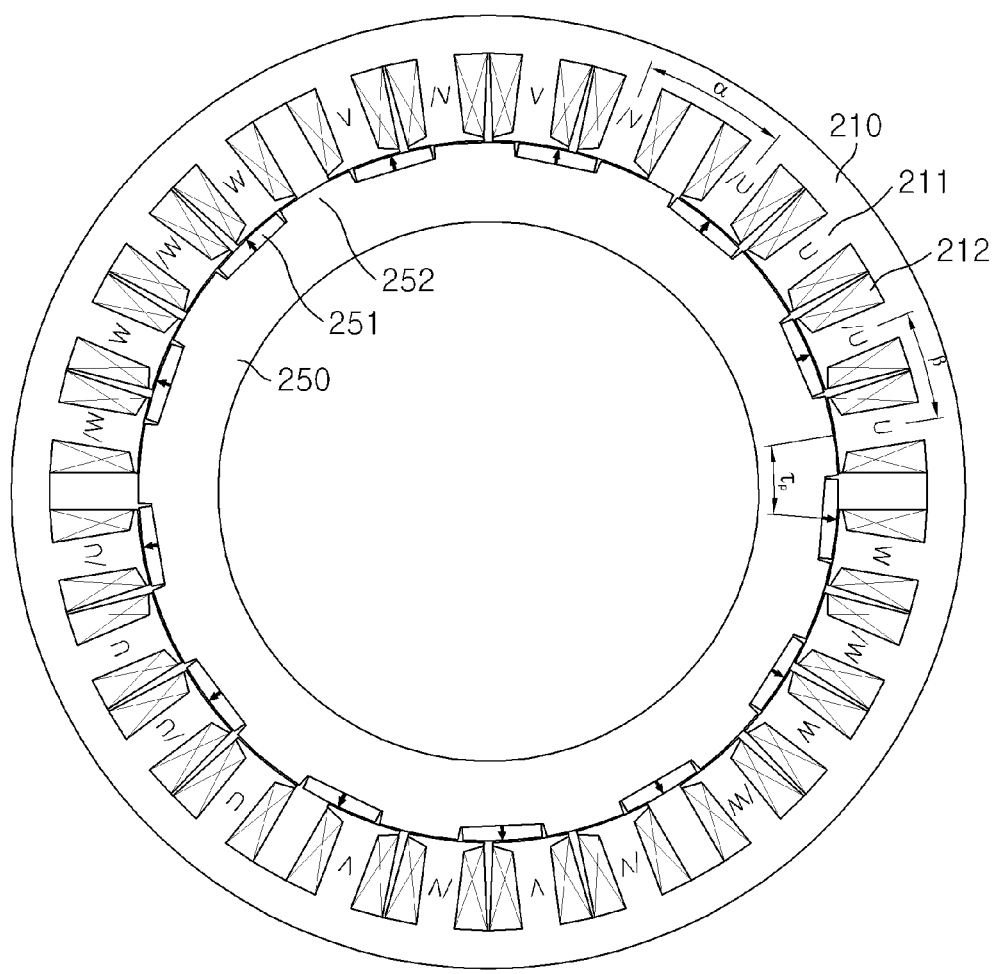
FIG. 15 is a diagram showing an example in which the structure of the present invention is used in the form of a rotatable electric machine.
Figure 16:
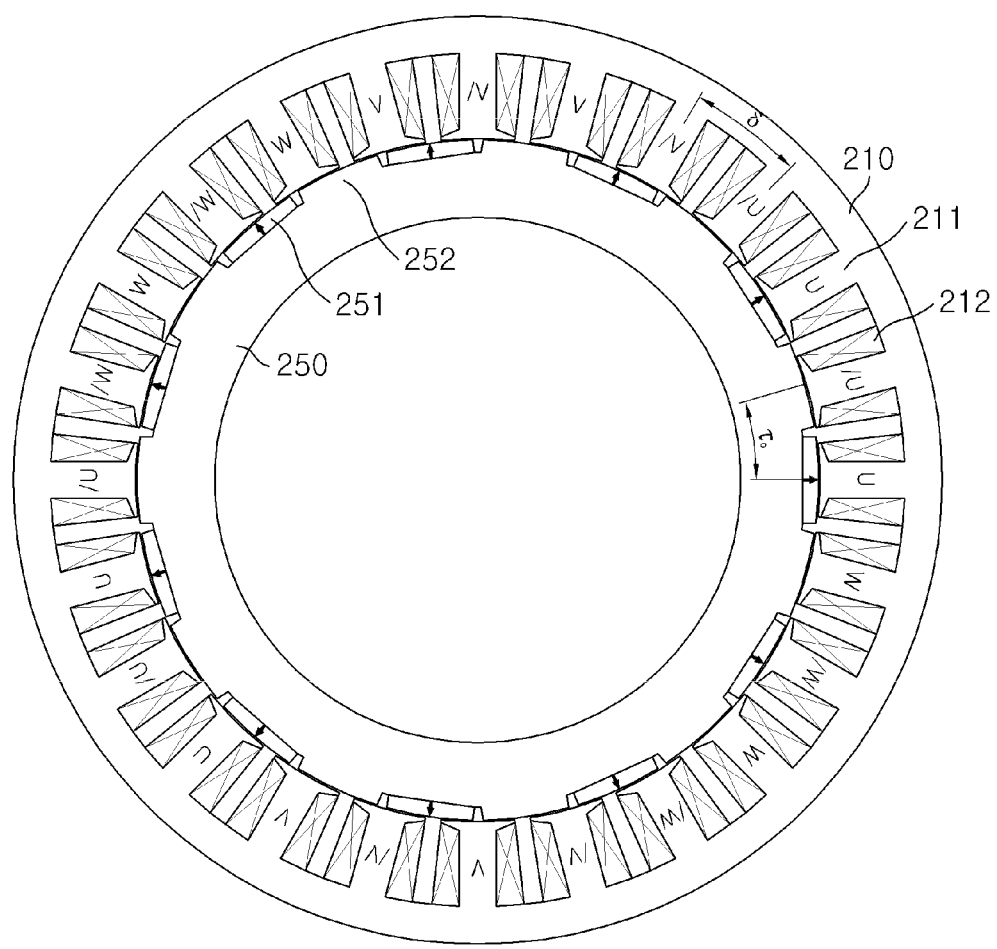
FIG. 16 is a diagram showing another example in which the structure of the present invention is used in the form of a rotatable electric machine.

Meanwhile, the structures shown in FIGS. 2 to 6 according to the present invention can be used in the form of a rotatable electric machine, as shown in FIGS. 15 and 16.

Referring to FIG. 15, the stator 150 of FIG. 3, for example, can be used as a circular rotator 250 provided in a circular stator 210, and the stator 210 can be configured such that, as shown in FIG. 3, in the case of 3 phases (N=3), one or more pairs of U and /U phase windings, among phase windings included in a phase winding group composed of four phase windings for U and /U that are repeated adjacent to each other, can be connected in series. Further, in the stator 210, one or more pairs of V and /V phase windings, among the phase windings included in a phase winding group composed of four phase windings for V and /V that are repeated adjacent to each other, can be connected in series. Furthermore, one or more pairs of W and /W phase windings, among the phase windings included in a phase winding group composed of four phase windings for W and /W that are repeated adjacent to each other, can be connected in series.

Here, the number of phase windings in each phase winding group for U, V, and W may be 2, as shown in FIG. 2, may be 4, as shown in FIG. 3, and may be an even number greater than 4, or an odd number, such as 3, 5, 7, . . . , depending on the circumstances.

In this case, the phase windings of each phase winding group are wound side by side to be spaced apart from each other by a predetermined interval β, for example, to electrically have a difference corresponding to a phase angle of 180°, and the phase winding groups are arranged such that a separation distance therebetween electrically has a difference corresponding to a phase angle of, for example, 180/N, that is, 60° when N=3. Consequently, phase windings at adjacent opposite ends of two groups are arranged to be spaced apart from each other by a predetermined interval α, for example, to electrically have a difference corresponding to a phase angle of 120°.

Further, referring to FIG. 16, the stator 150 shown in FIG. 5 can be used as a circular rotator 250 provided in a circular stator 210, wherein the teeth 211 of the stator 210 can be arranged at regular intervals of δ, as shown in FIG. 5. Here, one or more pairs of windings for a corresponding phase and a /phase, among (an even number or odd number of) phase windings wound around the teeth 211 in each phase winding group, are connected in series. δ can be determined by the above Equation 1.

As shown in FIGS. 15 and 16, the structures of FIGS. 2 to 6 according to the present invention can be used by those skilled in the art in the form of not only an internal rotation-type electric machine, but also an external rotation-type electric machine, by means of slight modification of design.

The doubly salient electric machine that has been described can reduce the number of permanent magnets used, compared to a conventional form because a stator is composed of permanent magnets and stator salient poles neighboring the permanent magnets, can provide an electric machine capable of reducing the pulsation of a propulsive force and a attraction force thanks to a structure in which a first mover and a second mover are arranged to be electrically spaced apart from each other by a predetermined phase angle, and can cancel magnetic attraction forces by means of double-sided arrangement of a mover or a stator. Therefore, since the doubly salient electric machine according to the present invention can acquire low-noise/low-vibration, high-precision, and high-propulsive motions, it can be used in fields requiring direct driving or precise location control, or various application devices requiring linear or rotary motions, such as power generators, compressors, processors, or industrial electric machines.

As described above, although the present invention has been described with reference to limited embodiments and drawings, the present invention is not limited by those embodiments and those skilled in the art can perform various changes and modifications from the above description. Therefore, the scope of the present invention should not be limited by the above-described embodiments, and should be defined by the accompanying claims and equivalents thereof.

The invention claimed is:
1. An electric machine comprising:
a stator comprising permanent magnets that have a same polarity in depressions between adjacent stator salient poles of an iron core, the iron core comprising a plurality of stator salient poles; and
a mover configured to move while facing the stator, the mover comprising an N (a number of power phases) multiple number of teeth and phase windings, each of the phase windings wound around a corresponding one of at least some of the teeth, wherein the mover includes a plurality of phase winding groups and is configured such that a plurality of phase windings are included in a phase winding group for each of N phases, wherein adjacent phase winding groups within the mover are arranged such that a separation distance (α) between the adjacent phase winding groups electrically has a difference corresponding to a phase angle of 180/N°, wherein the phase windings of the mover include phase windings for three phases U, V, and W and phase windings for three phases /U, /V, and /W having a phase difference of 180° with respect to the respective three phases, wherein the mover comprises a first phase winding group including phase windings for the U and /U phases that are disposed alternately and adjacent to each other, a second phase winding group including phase windings for the V and /V phases that are disposed alternately and adjacent to each other, and a third phase winding group including phase windings for the W and /W phases that are disposed alternately and adjacent to each other, wherein an odd number or even number of phase windings for the U and /U phases, among the phase windings included in the first phase winding group, are connected in series, an odd number or even number of phase windings for the V and /V phases, among the phase windings included in the second phase winding group, are connected in series, and an odd number or even number of phase windings for the W and /W phases, among the phase windings included in the third phase winding group, are connected in series, and wherein the mover comprises the teeth, adjacent teeth being arranged at a regular interval of δ, and δ is determined by $\delta=(N_t \pm m)\tau_p/N_t$, where $N_t$ denotes the number of the teeth, m denotes a natural number less than $N_t$, and $\tau_p$ denotes a pole pitch of the stator.

2. The electric machine of claim 1, wherein the stator salient poles are arranged such that the pole pitch ($\tau_p$) corresponding to a distance from a first end of each permanent magnet to an end of a stator salient pole adjacent to a second end of the permanent magnet electrically has a phase angle of 180°.

3. The electric machine of claim 1, wherein the stator is a first stator, the machine further comprising a second stator, and wherein the first and second stators are arranged on opposite sides of the mover along a direction perpendicular to a moving direction of the mover such that a first magnetic attraction force between the mover and the first stator cancels out a second magnetic attraction force between the mover and the second stator.

4. The electric machine of claim 1, wherein the mover is a first mover, the machine further comprising a second mover, and wherein the first and second movers are arranged on opposite sides of the stator, such that a first magnetic attraction force between the stator and the first mover cancels out a second magnetic attraction force between the stator and the second mover.

5. The electric machine of claim 1, wherein:
the stator has a circular shape; and
the mover rotates inside or outside the stator.

6. An electric machine comprising:

a stator comprising permanent magnets that have a same polarity in depressions between adjacent stator salient poles of an iron core, the iron core comprising a plurality of stator salient poles; and a first mover and a second mover configured to move while facing the stator, each of the first and second movers comprising an N (a number of power phases) multiple number of teeth and phase windings, each of the phase windings wound around a corresponding one of at least some of the teeth, wherein each of the first mover and the second mover includes a plurality of phase winding groups and is configured such that a plurality of phase windings are included in a phase winding group for each of N phases, wherein adjacent phase winding groups within the first mover or the second mover are arranged such that a separation distance (α) between the adjacent phase winding groups within the first mover or the second mover electrically has a difference corresponding to a phase angle of 180/N°, wherein the phase windings of the first mover or the second mover include phase windings for three phases U, V, and W and phase windings for three phases /U, /V, and /W having a phase difference of 180° with respect to the respective three phases, wherein each of the first and second movers comprises a first phase winding group including phase windings for the U and /U phases that are disposed alternately and adjacent to each other, a second phase winding group including phase windings for the V and /V phases that are disposed alternately and adjacent to each other, and a third phase winding group including phase windings for the W and /W phases that are disposed alternately and adjacent to each other, wherein, in each of the first and second movers, an odd number or even number of phase windings for the U and /U phases, among the phase windings included in the first phase winding group, are connected in series, an odd number or even number of phase windings for the V and /V phases, among the phase windings included in the second phase winding group, are connected in series, and an odd number or even number of phase windings for the W and /W phases, among the phase windings included in the third phase winding group, are connected in series, and wherein each of the first and second movers comprises the teeth, adjacent teeth being arranged at a regular interval of δ, and δ is determined by $\delta=(N_t \pm m)\tau_p/N_t$, where $N_t$ denotes the number of the teeth, m denotes a natural number less than $N_t$, and $\tau_p$ denotes a pole pitch of the stator.

* * * * *